United States Patent
Suzuki et al.

(10) Patent No.: US 9,410,710 B2
(45) Date of Patent: Aug. 9, 2016

(54) PURIFIED AIR DISCHARGE DEVICE

(75) Inventors: Taketo Suzuki, Tokyo (JP); Tomoyuki Kakinuma, Tokyo (JP); Kozo Nitta, Tokyo (JP); Yuki Fujishiro, Tokyo (JP); Kazuma Fukiura, Tokyo (JP); Takahiro Sato, Tokyo (JP)

(73) Assignee: Koken Ltd., Tokyo (JP)

( * ) Notice: Subject to any disclaimer, the term of this patent is extended or adjusted under 35 U.S.C. 154(b) by 232 days.

(21) Appl. No.: 14/347,330

(22) PCT Filed: Jun. 22, 2012

(86) PCT No.: PCT/JP2012/066033
§ 371 (c)(1),
(2), (4) Date: Aug. 18, 2014

(87) PCT Pub. No.: WO2013/051311
PCT Pub. Date: Apr. 11, 2013

(65) Prior Publication Data
US 2015/0128541 A1      May 14, 2015

(30) Foreign Application Priority Data

Oct. 3, 2011 (JP) ................................ 2011-219659
May 22, 2012 (JP) ................................ 2012-116855

(51) Int. Cl.
*F24F 3/16* (2006.01)
*F24F 9/00* (2006.01)
(Continued)

(52) U.S. Cl.
CPC .............. *F24F 3/1607* (2013.01); *F24F 3/1603* (2013.01); *F24F 9/00* (2013.01);
(Continued)

(58) Field of Classification Search
CPC ................ B01D 46/00; B01D 46/0013; B01D 46/0023; B23K 9/321; F24F 3/1607; F24F 3/161; F24F 13/068; F24F 7/06
USPC ........... 55/385.2, DIG. 18, DIG. 29, DIG. 46; 454/49, 56, 59, 184, 187, 188, 189
See application file for complete search history.

(56) References Cited

U.S. PATENT DOCUMENTS 3,998,142 A    12/1976  Foreman et al.
4,023,472 A    5/1977   Grunder et al.
(Continued)

FOREIGN PATENT DOCUMENTS

JP    55-118754    9/1980
JP    57-28225     2/1982
(Continued)

OTHER PUBLICATIONS

EESR for App. No. 12820022.7 (counterpart of U.S. Appl. No. 14/234,737) issued on Feb. 23, 2015.
(Continued)

*Primary Examiner* — Duane Smith
*Assistant Examiner* — Minh-Chau Pham
(74) *Attorney, Agent, or Firm* — Greer Burns & Crain Ltd.

(57) ABSTRACT

A purified air discharge device includes a push hood (2) having an air flow discharge surface (23) discharging a uniform purified air flow. The push hood (2) is provided with a lateral air discharger (28) for creating a purified air flow that collides against a surrounding wall that is formed as the push hood (2) is installed and that is situated close along the circumferential direction of the air flow discharge surface (23) of the push hood (2).

10 Claims, 5 Drawing Sheets

(51) Int. Cl.
F24F 13/28 (2006.01)
F24F 13/06 (2006.01)
F24F 1/00 (2011.01)
F24F 13/08 (2006.01)

(52) U.S. Cl.
CPC .............. *F24F 13/06* (2013.01); *F24F 13/28* (2013.01); *F24F 2001/0096* (2013.01); *F24F 2003/1614* (2013.01); *F24F 2009/007* (2013.01); *F24F 2013/0608* (2013.01); *F24F 2013/088* (2013.01)

(56) References Cited

U.S. PATENT DOCUMENTS

| | | | | |
|---|---|---|---|---|
| 4,927,438 | A * | 5/1990 | Mears | F24F 3/1607 454/56 |
| 5,326,316 | A * | 7/1994 | Hashimoto | F24F 3/161 454/187 |
| 5,487,768 | A * | 1/1996 | Zytka | B01D 46/0023 454/187 |
| 6,113,486 | A | 9/2000 | Beudon et al. | |
| 6,632,260 | B1 * | 10/2003 | Siemers | B01D 46/0013 454/184 |
| 2004/0198215 | A1 | 10/2004 | Bridenne et al. | |
| 2012/0297741 | A1 * | 11/2012 | Reid | B23K 9/321 55/385.2 |
| 2014/0366498 | A1 * | 12/2014 | Suzuki | F24F 7/06 55/385.2 |
| 2015/0059298 | A1 * | 3/2015 | Suzuki | F24F 13/068 55/385.2 |

FOREIGN PATENT DOCUMENTS

| | | |
|---|---|---|
| JP | 61-027435 | 2/1986 |
| JP | 63-176943 | 7/1988 |
| JP | 64-034420 | 2/1989 |
| JP | 03-080951 | 4/1991 |
| JP | 6-178907 | 6/1994 |
| JP | 09-057033 | 3/1997 |
| JP | 11-218355 | 8/1999 |
| JP | 2003-31451 | 1/2003 |
| JP | 2004-012038 | 1/2004 |
| JP | 2004-525337 | 8/2004 |
| JP | 2006-242419 | 9/2006 |
| JP | 2008-275266 | 11/2008 |
| WO | WO 98/50134 | 11/1998 |
| WO | WO 2005/113169 | 12/2005 |
| WO | WO 2011/085735 A1 | 7/2011 |

OTHER PUBLICATIONS

EESR for App. No. 12837874.2 (counterpart application of U.S. Appl. No. 14/347,330) issued on Oct. 4, 2015.
Int'l. Search Report issued in Int'l. App. No. PCT/JP2012/066033, mailed Sep. 4, 2012.
Translation of Informal Comment submitted to WIPO on Feb. 20, 2013.
Australian Examination Report issued Mar. 27, 2015 in App. No. 2012319869.
Canadian First Examiner's Report issued Apr. 2, 2015, in App. No. 2,850,285.
Korean Office Action issued Apr. 22, 2015 in App. No. 10-2014-7007201.
Canadian Second Examiner's Report issued Jan. 14, 2016, in Canadian App. No. 2,841,243.
Extended European Search Report issued on Feb. 23, 2015 in App. No. 12 811 470.9.
U.S. Appl. No. 14/131,599, filed Jan. 8, 2014.
U.S. Appl. No. 14/234,737, filed Aug. 18, 2014.
Int'l. Search Report issued in Int'l. App. No. PCT/JP2012/066031, mailed Aug. 28, 2012 (with translation).
Int'l. Search Report issued in Int'l. App. No. PCT/JP2012/066032, mailed Aug. 28, 2012 (with translation).

* cited by examiner

PURIFIED AIR DISCHARGE DEVICE

This is a National Phase Application filed under 35 U.S.C. §371, of International Application No. PCT/JP2012/066033, filed Jun. 22, 2012.

TECHNICAL FIELD

The present invention relates to a purified air discharge device.

BACKGROUND ART

Clean benches have often been used as a device for improving the air cleanliness in a local work area. A conventional clean bench has a work opening only on the front side of the work table and is enclosed on the other sides for maintaining cleanliness. Such a clean bench is provided with a purified air discharge port within the enclosure and the worker inserts his hands from the front work opening to do tasks.

However, the work opening of a clean bench is small and causes a problem with the workability when the worker assembles precise machines or does other tasks. Furthermore, where products or manufacturing parts are moving as on a manufacturing line, a traditional measure is to enclose the entire line in a clean room; then, a problem is that the equipment becomes large.

For the above reason, a local cleaning apparatus has been proposed (Patent Literature 1) in which a pair of push hoods (purified air discharge devices) capable of discharging a uniform purified air flow is placed with their air flow opening surfaces facing each other so that the air flows from their respective air flow opening surfaces collide with each other and create a purified air space having a higher level of cleanliness in the area between the pair of push hoods than in the other areas.

CITATION LIST

Patent Literature

Patent Literature 1: Unexamined Japanese Patent Application Kokai Publication No. 2008-275266.

SUMMARY OF INVENTION

Technical Problem

By the way, when the purified air discharge device of a local cleaning apparatus that discharges purified air is placed on a floor, unpurified air may be entrained by the air flow and dragged in from between the purified air discharge device and floor surface unless the purified air discharge device and floor surface are in close and airtight contact. Furthermore, when a guide is attached to the purified air discharge device to convey the purified air a long distance, unpurified air may be dragged in from between the purified air discharge device and guide unless the device and guide are in close and airtight contact. As just stated, the purified air discharge device of a local air purifying device may require some elaboration to install. Then, a purified air discharge device that can easily be installed is demanded.

The present invention is invented with the view of the above situation and an exemplary objective of the present invention is to provide a purified air discharge device that can easily be installed.

Solution to Problem

In order to achieve the above objective, the purified air discharge device according to a first exemplary aspect of the present invention comprises:

a push hood comprising an air flow discharge surface discharging a uniform purified air flow, wherein the push hood is provided with a lateral air discharger for creating a purified air flow that collides against a surrounding wall that is formed as the push hood is installed and that is situated close along the circumferential direction of the air flow discharge surface of the push hood.

The purified air discharge device according to a second exemplary aspect of the present invention comprises:

a push hood comprising an air flow discharge surface discharging a uniform purified air flow, wherein the push hood is provided with a lateral air discharger discharging a uniform purified air flow on all sides of the air flow discharge surface.

It is preferable that the lateral air discharger is formed across the surface on which the lateral air discharger is provided in the circumferential direction of the air flow discharge surface.

The push hood comprises, for example, multiple push hoods connected.

It is preferable that the flow rate of the uniform purified air flow discharged from the air flow discharge surface is 0.1 to 1.0 m/s.

It is preferable that the flow rate of the uniform purified air flow discharged from the air flow discharge surface is 0.2 to 0.5 m/s.

Advantageous Effects of Invention

The present invention can provide a purified air discharge device that can easily be installed.

DESCRIPTION OF EMBODIMENTS

The purified air discharge device of the present invention will be described hereafter with reference to the drawings.

Figure 1:
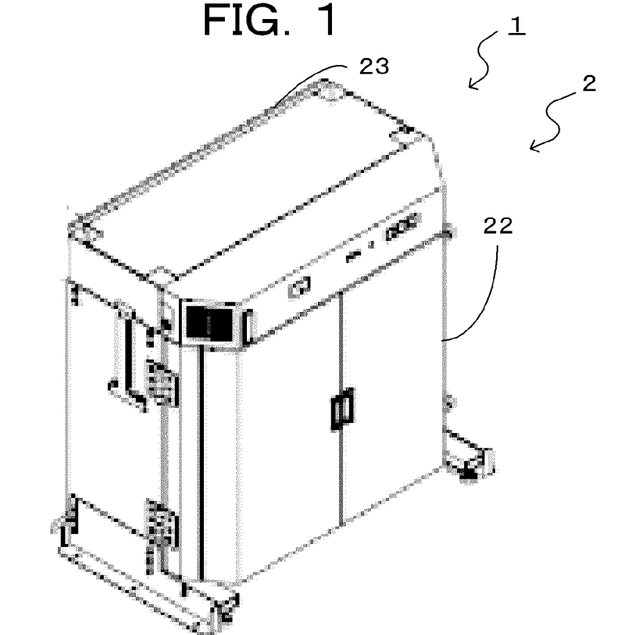
FIG. 1 is an illustration showing the purified air discharge device of the present invention.

FIG. 1 shows the purified air discharge device of this embodiment. As shown in FIG. 1, a purified air discharge device 1 of this embodiment comprises a push hood 2.

It is basically sufficient that the push hood 2 has at least a mechanism to discharge a uniform purified air. The push hood 2 can be structured to have a purifying filter installed in the basic structure of a push hood conventionally used in push-pull ventilators. However, as described later, the push hood 2 is provided with a lateral air discharger for creating a purified air flow that collides against a surrounding wall that is formed as the push hood 2 is installed and that is situated close along the circumferential direction of the air flow discharge surface of the push hood 2 such as a floor surface, guide, and wall surface.

Here, the uniform air flow and uniform flow are defined as the same as the uniform flow described in "Plant Ventilation" by Taro Hayashi (published by The Society of Heating, Air Conditioning, and Sanitary Engineers of Japan, 1982), and means a uniformly continuous flow of a breeze speed causing no significant swirl. However, the present invention does not intend to provide an air discharge device precisely defining the air flow rate and air speed profile. Preferably, a uniform air flow has a fluctuation in speed profile of within ±50% or even within ±30% from the average value when no obstacle is present.

Figure 2:
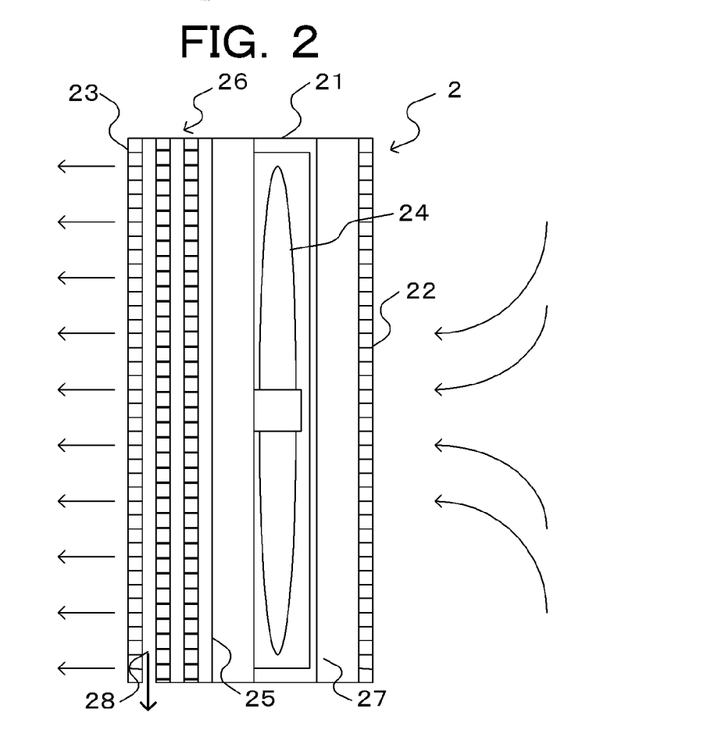
FIG. 2 is an illustration showing the structure of the push hood.

FIG. 2 shows the structure of the push hood 2. As shown in FIG. 2, the push hood 2 has a housing 21 in the form of a nearly rectangular parallelepiped, on one side of which an air flow suction surface 22 is formed. The air flow suction surface 22 comprises, for example, a surface in which multiple holes are formed on one entire side of the housing 21. The air flow suction surface 22 introduces the outdoor or indoor air that is the ambient air outside the push hood 2 from the holes. Furthermore, an air discharge surface 23 is formed on another side of the housing 21 that is opposite to the air flow suction surface 22. The air discharge surface 23 comprises, for example, a surface in which multiple holes are formed on one entire side of the housing 21. The air discharge surface 23 discharges a uniform purified air flow formed in the push hood 2 to the outside of the push hood 2 from the holes. The size of the air flow discharge surface 23 of the push hood 2 is not particularly restricted and, for example, 1050 mm×850 mm. Furthermore, the flow rate of the uniform purified air flow discharged from the air flow discharge surface 23 is preferably 0.1 to 1.0 m/s and more preferably 0.2 to 0.5 m/s.

A fanning mechanism 24, a high performance filter 25, and a rectifying mechanism 26 are provided in the housing 21.

The fanning mechanism 24 is provided on the side closer to the air flow suction surface 22 in the housing 21. The fanning mechanism 24 comprises an air discharge fan or the like. The fanning mechanism 24 introduces the outdoor or indoor air that is the ambient air around the push hood 2 from the air flow suction surface 22 and discharges an air flow from the air flow discharge surface 23. Furthermore, the fanning mechanism 24 is constructed so that the flow rate of the air flow discharged from the air flow discharge surface 23 is changeable by controlling the discharge power of the fan.

The high performance filter 25 is provided between the fanning mechanism 24 and rectifying mechanism 26. The high performance filter 25 comprises a high performance filter corresponding to the purification level such as a HEPA filter (high efficiency particulate air filter) and ULPA filter (ultra low penetration air filter) for filtering the introduced ambient air. The high performance filter 25 purifies the ambient air introduced by the fanning mechanism 24 to purified air of a desired purification level. The purified air purified by the high performance filter 25 to a desired purification level is sent to the rectifying mechanism 26 by the fanning mechanism 24.

The rectifying mechanism 26 is provided between the high performance filter 25 and air flow discharge surface 23. The rectifying mechanism 26 comprises a not-shown air-resistant body, which is formed by a punching plate or net member. The rectifying mechanism 26 corrects (rectifies) the air sent from the high performance filter 25 and uneven in airflow across the air flow discharge surface 23 to an equalized air flow even in airflow across the air flow discharge surface 23 (a uniform air flow). The rectified, uniform air flow is discharged from the entire air flow discharge surface 23 to the outside of the push hood 2 by the fanning mechanism 24.

Furthermore, it is preferable that the push hood 2 comprises a pre-filter 27 provided between the air flow suction surface 22 and fanning mechanism 24 in the housing 21 as shown in FIG. 2. The pre-filter 27 can be, for example, an intermediate performance filter. With the pre-filter 27 being provided between the air flow suction surface 22 and fanning mechanism 24, relatively large coarse particulates contained in the ambient air introduced in the housing 21 via the air flow suction surface 22 can be removed. As just stated, since the coarse particulates can be removed in multiple steps depending on the size of coarse particulates contained in the ambient air, the high performance filter 25, which is easily clogged, can maintain its performance for a prolonged time.

The push hood 2 is provided with a lateral air discharger 28 for creating a purified air flow colliding against a floor surface (surrounding wall). It is sufficient that the lateral air discharger 28 is structured to discharge part of the uniform air flow rectified by the rectifying mechanism 26 from the bottom surface of the housing 2 to the floor surface. For example, as shown in FIG. 2, the lateral air discharger 28 is formed by multiple holes connecting the rectifying mechanism 26 and the bottom surface of the housing 21.

Here, it is preferable that the multiple holes of the lateral air discharger 28 are formed across the surface on which the lateral air discharger 28 is provided (the underside in FIG. 2) in the circumferential direction (width direction) of the lateral air discharger 28. Furthermore, it is preferable that the wind speed of the air flow discharged from the lateral air discharger 28 is uniform. Furthermore, it is preferable that the wind speed of the air flow discharged from the air flow discharge surface 23 is equal to the wind speed of the air flow discharged from the lateral air discharger 28. Furthermore, it is preferable that the distance between the surrounding wall against which the air flow discharged from the lateral air discharger 28 collides and the surface of the push hood that is situated close to the surrounding wall is constant. With such an arrangement, it is difficult for the ambient air to enter the area between the lateral air discharger 28 and floor surface.

With the push hood 2 having the above structure, the ambient air introduced by the fanning mechanism 24 is purified by the pre-filter 27 and high performance filter 25 to purified air of a desired purification level. Then, the purified air is rectified by the rectifying mechanism 26 to a uniform air flow. The uniform purified air flow is discharged from the entire air flow discharge surface 23 to the outside in the direction nearly perpendicular to the air flow discharge surface 23 of the push hood 2. Furthermore, part of the uniform purified air flow is discharged from the lateral air discharger 28 toward the floor surface in the direction nearly perpendicular to the bottom surface of the push hood 2.

Figure 3:
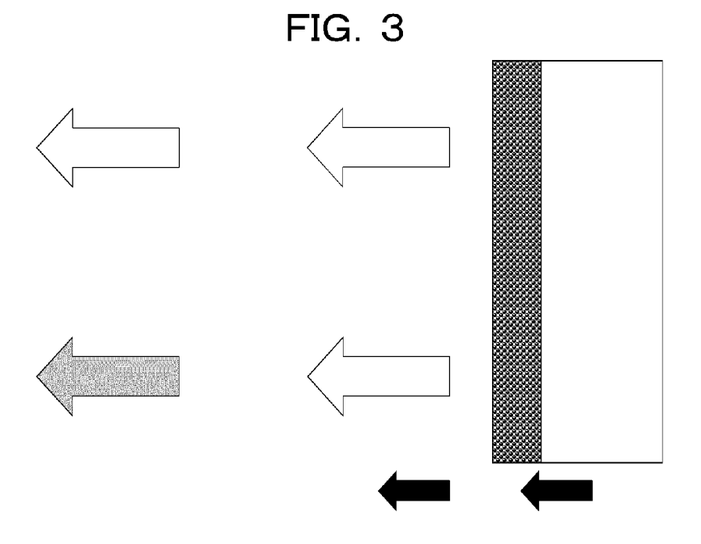
FIG. 3 is an illustration for explaining the air flow between the prior art push hood and a floor surface.

With the local air purifying device of the Patent Literature 1, the push hood discharging a uniform purified air flow is installed directly on a desk or the like. When operated, the vibration of the push hood is transmitted to the desk unless a vibration absorbing rubber or the like is interposed between the desk and the surface in contact with the desk. Then, when a vibration absorbing rubber is interposed, a space tends to be created between the desk and push hood. If a space is created between the desk and push hood as in this case, as shown in FIG. 3, unpurified air in the room is entrained by the uniform air flow discharged from the push hood and dragged in the uniform purified air flow.

Figure 4:
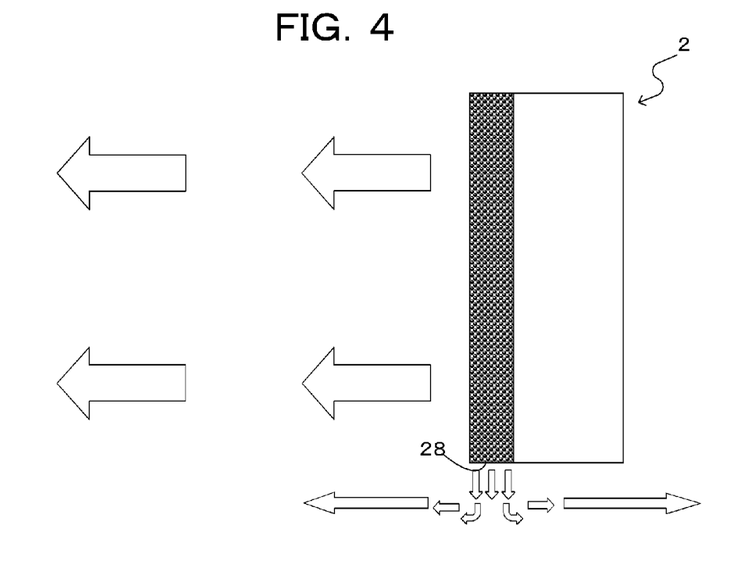
FIG. 4 is an illustration for explaining the air flow between the push hood of the present invention and a floor surface.

On the other hand, the push hood 2 of the present invention is provided on its bottom surface with the lateral air discharger 28 discharging part of the uniform air flow rectified by the rectifying mechanism 26, whereby the uniform air flow discharged from the lateral air discharger 28 collides against the floor surface. As shown in FIG. 4, the uniform air flow discharged from the lateral air discharger 28 collides against the floor surface, and then part of the collided uniform air flow flows outward from the floor surface where the collision occurred. Therefore, the air on the side of the air flow suction surface 22 of the push hood 2 (the ambient air outside the local air purifying device) does not enter the area between the floor surface and lateral air discharger 28. Then, the cleanliness in the area on the side of the air flow discharge surface 23 of the push hood 2 is maintained. Hence, it is unnecessary for the purified air discharge device 1 and floor surface to be in close and airtight contact, whereby the purified air discharge device 1 can easily be installed.

Here, the distance between the floor surface (surrounding wall) and lateral air discharger 28 (push hood 2) is preferably 50 mm or less and more preferably 20 mm or less. With this ranges, it is more difficult for the air on the side of the air flow suction surface 22 of the push hood 2 to enter the area between the floor surface and lateral air discharger 28, whereby the cleanliness in the area on the side of the air flow discharge surface 23 of the push hood 2 is maintained.

Furthermore, it is preferable that when a uniform air flow discharged from the lateral air discharger 28 collides against the floor surface (surrounding wall) and the collided uniform air flow meets with the uniform air flow discharged from the air flow opening surface 23, the two air flows have a nearly equal wind speed. This is because, if so, the uniformity of the uniform air flow discharged from the air flow opening surface 23 is maintained.

As described above, the local air purifying device 1 of this embodiment is provided with the lateral air discharger 28 discharging part of a uniform air flow rectified by the rectifying mechanism 26 on the bottom surface of the push hood 2, whereby the ambient air on the side of the air flow suction surface 22 of the purified air discharge device 1 (outside the local air purifying device) does not enter the area between the floor surface and lateral air discharger 28. Hence, it is unnecessary for the purified air discharge device 1 and a surrounding wall such as a floor surface to be in close and airtight contact, whereby the purified air discharge device 1 can easily be installed.

The present invention is not confined to the above-described embodiment and various modifications and applications are available. Other embodiments applicable to the present invention will be described hereafter.

Figure 5:
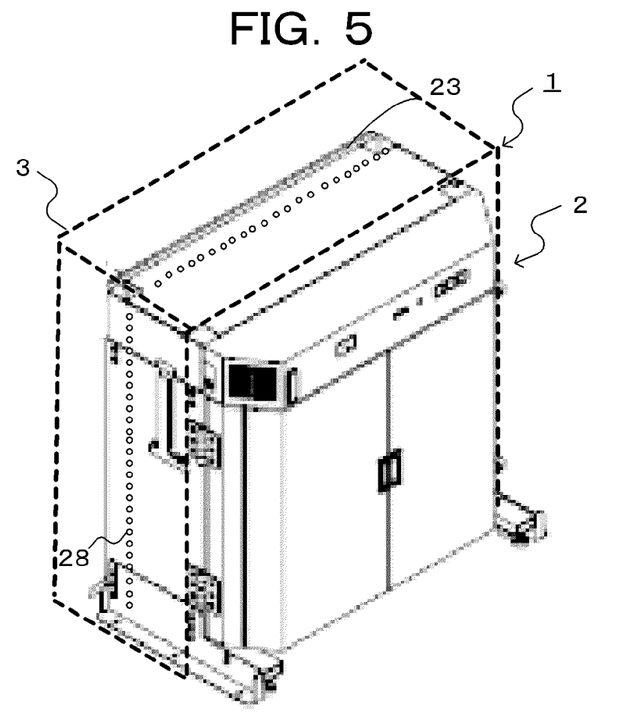
FIG. 5 is an illustration showing the structure of the push hood of another embodiment.

In the above-described embodiment, the present invention is described using the case in which the member situated close to the push hood 2 is a floor. It is sufficient for the present invention that the lateral air discharger 28 is provided on the surface facing the member situated close to the push hood 2. For example, as shown in FIG. 5, the lateral air discharger 28 can be provided to the push hood 2 not only at a position facing the floor surface but also at a position facing a guide 3 provided to the push hood 2. In such a case, the lateral air discharger 28 discharging a uniform purified air flow toward the floor surface is provided on the bottom surface of the push hood 2 and the lateral air discharger 28 discharging a uniform purified air flow toward the guide 3 is provided on the side surfaces and top surface of the push hood 2.

If a guide is provided to the push hood of the Patent Literature 1 (for conveying a uniform purified air flow a long distance), unpurified air is mixed from the space between the push hood and the guide and contaminates the uniform purified air flow discharged from the push hood unless airtight connection is made between the push hood and the guide. On the other hand, the push hood 2 of the present invention is provided with the lateral air discharger 28 on the surfaces facing the guide 3 and the purified air is discharged from the lateral air discharger 28. Then, the air pushes and flows outward from between the guide 3 and lateral air discharger 28, whereby the uniform purified air flow discharged from the air flow discharge surface 23 is not contaminated. Hence, it is unnecessary for the push hood 2 and the connector to the guide 3 to be in close and airtight contact, whereby the purified air discharge device 1 can easily be installed.

Furthermore, if there is a wall situated close to (a side) of the push hood 2, the lateral air discharger 28 can be provided on the surface facing the wall. In such a case, it is unnecessary for the push hood 2 and the connector to the wall to be in close and airtight contact, whereby the purified air discharge device 1 can easily be installed.

Figure 6:
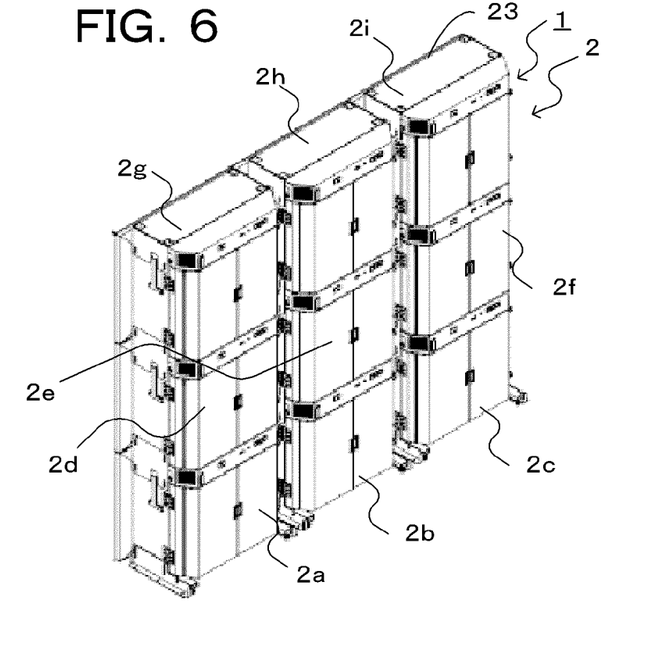
FIG. 6 is an illustration showing the structure of the push hood of another embodiment.

In the above-described embodiment, the present invention is described using the case in which the push hood 2 comprises a single push hood. The push hood 2 can comprise two or more push hoods. For example, the push hood 2 can comprise four (two in the vertical direction×two in the horizontal direction) push hoods connected by connectors. Alternatively, the push hood 2 can comprise nine (three in the vertical direction×three in the horizontal direction) push hoods connected by connectors. When the push hoods 2 are connected as just stated, the push hoods are arranged so that the air flow opening surfaces of the push hoods face in the same direction and the short sides and long sides of the push hoods are next to each other, respectively. For example, as shown in FIG. 6, the push hood 2 comprises nine push hoods connected by connectors so that the air flow opening surfaces thereof face in the same direction and the short sides and long sides thereof are next to each other, respectively, the push hoods 2d to 2i of which the bottom surfaces do not face the installation floor surface can be a push hood conventionally used in the push-pull ventilators. On the other hand, the push hoods 2a to 2c of which the bottom surfaces face the floor surface on which the push hood 2 is installed have the prior art push hood structure and are additionally provided with the lateral air discharger 28 discharging a uniform purified air flow toward the floor surface. Also in such a case, with the lateral air discharger 28 being provided at a position facing the bottom surface of the push hood 2, the purified air discharge device 1 can easily be installed.

Furthermore, the push hood 2 can be provided with castors on the bottom surface. In such a case, the push hood 2 can easily be moved. Needless to say, such a push hood 2 can be used not only with a local air purifying device but also as a push hood of a push-pull ventilator. Furthermore, the shape of the push hood 2 is not restricted to nearly rectangular parallelepipeds.

Embodiments

Specific embodiments of the present invention will be given hereafter to further describe the present invention.

Figure 7:
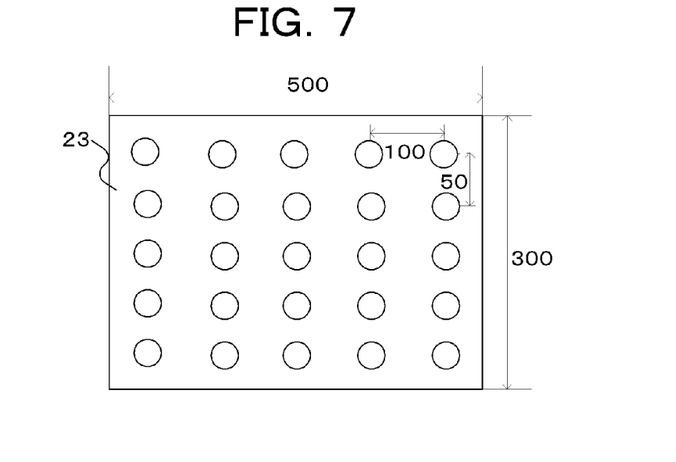
FIG. 7 is an illustration showing the measuring points in the fluctuation test.

First, it was checked whether the wind speed of the air flow discharged from the air flow discharge surface 23 fluctuated as a result of an air flow discharged from the lateral air discharger 28 of the push hood 2. Under different wind speeds of 0.2 to 0.5 m/s, the wind speed was measured at the measuring points shown in FIG. 7 when an air flow was/was not discharged toward the floor surface from the lateral air discharger 28 provided on the underside of the push hood 2. The air flow discharge surface 23 of the push hood 2 was 300 mm in height and 500 mm in width. The lateral air discharger 28 discharged an air flow of 10 mm in width. The push hood 2 was provided with vibration absorbing rubber pieces at four points (not shown) on the surface in contact with the floor surface. The distance between the floor surface and the surface of the push hood 2 that is situated close to the floor surface was approximately 5 mm. Table 1 shows the results when the lateral air discharger 28 discharged no air flow. Table 2 shows the results when the lateral air discharger 28 discharged an air flow.

TABLE 1

| set wind speed (m/s) | average wind speed (m/s) | fluctuation upper limit (%) | fluctuation lower limit (%) |
|---|---|---|---|
| 0.5 | 0.51 | 17.8 | 16.4 |
| 0.4 | 0.40 | 18.0 | 19.8 |
| 0.3 | 0.29 | 20.2 | 22.8 |
| 0.2 | 0.22 | 20.8 | 22.2 |

TABLE 2

| set wind speed (m/s) | average wind speed (m/s) | fluctuation upper limit (%) | fluctuation lower limit (%) |
|---|---|---|---|
| 0.5 | 0.48 | 18.8 | 15.1 |
| 0.4 | 0.41 | 22.8 | 18.0 |
| 0.3 | 0.29 | 19.8 | 18.8 |
| 0.2 | 0.21 | 22.6 | 19.6 |

As shown in Tables 1 and 2, it was confirmed that whether an air flow is or is not discharged from the lateral air discharger 28, the wind speed of the air flow discharged from the air flow discharge surface 23 does not fluctuate.

Embodiments 1 to 4 and Comparative Embodiments 1 to 8

Figure 8:
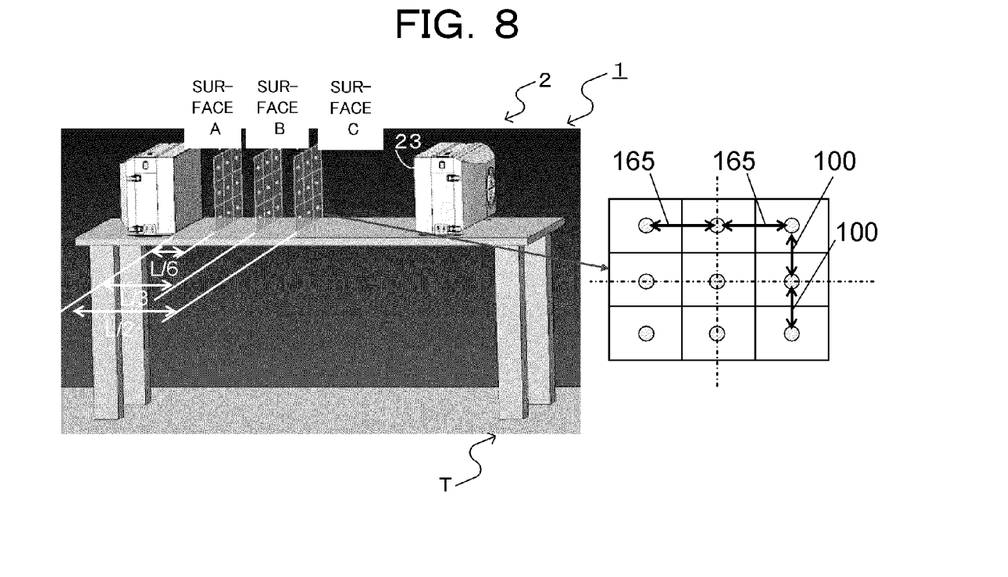
FIG. 8 is an illustration for explaining the device and measuring points in Embodiments 1 to 4 and Comparative Embodiments 1 to 8.

As shown in FIG. 8, the purified air discharge device 1 of the present invention was installed on a table T in the manner that the air flow discharge surfaces 23 of the push hoods 2 face each other. The cleanliness level was measured on Surfaces A (L/2), B (L/3), and C (L/6) under different air speeds and with different distances L between the push hoods 2. In these embodiments, an air flow was discharged from the air flow discharge surface 23 and an air flow was discharged toward the floor surface from the lateral air discharger 28 provided on the underside of the push hood 2. The cleanliness level was measured at a total of nine points that are the midpoints of trisected areas on each surface. For measuring the cleanliness level, the number of coarse particulates of 0.3 μm in particle size (counts/CF) was measured using LASAIR-II manufactured by PMS. The cleanliness levels of 300 counts/CF and lower were assumed to be highly clean. Tables 3 to 6 show the results. Additionally, Tables 7 to 10 show the results when no air flow was discharged from the lateral air discharger 28 (Comparative Embodiments 1-4).

TABLE 3 wind speed 0.5 m/s, L = 850 mm

| 1 | 0 | 1 | 3 | 4 | 3 | 2 | 0 | 2 |
|---|---|---|---|---|---|---|---|---|
| 0 | 0 | 0 | 1 | 0 | 1 | 0 | 0 | 0 |
| 0 | 0 | 0 | 0 | 0 | 0 | 0 | 1 | 0 |
| Surface A | | | Surface B | | | Surface C | | |

TABLE 4 wind speed 0.4 m/s, L = 700 mm

| 8 | 0 | 8 | 0 | 1 | 0 | 2 | 3 | 2 |
|---|---|---|---|---|---|---|---|---|
| 3 | 3 | 1 | 0 | 0 | 0 | 0 | 1 | 0 |
| 0 | 1 | 0 | 0 | 0 | 0 | 3 | 0 | 3 |
| Surface A | | | Surface B | | | Surface C | | |

TABLE 5 wind speed 0.3 m/s, L = 600 mm

| 0 | 0 | 0 | 3 | 1 | 3 | 0 | 1 | 0 |
|---|---|---|---|---|---|---|---|---|
| 1 | 0 | 1 | 0 | 1 | 0 | 3 | 0 | 3 |
| 2 | 2 | 2 | 0 | 0 | 0 | 0 | 0 | 0 |
| Surface A | | | Surface B | | | Surface C | | |

TABLE 6 wind speed 0.2 m/s, L = 600 mm

| 8 | 0 | 7 | 5 | 2 | 6 | 2 | 0 | 2 |
|---|---|---|---|---|---|---|---|---|
| 4 | 0 | 5 | 2 | 0 | 2 | 3 | 0 | 3 |
| 0 | 1 | 0 | 1 | 0 | 2 | 1 | 0 | 1 |
| Surface A | | | Surface B | | | Surface C | | |

TABLE 7 wind speed 0.5 m/s, L = 550 mm

| 1 | 1 | 1 | 1 | 2 | 0 | 2 | 1 | 0 |
|---|---|---|---|---|---|---|---|---|
| 0 | 0 | 0 | 2 | 1 | 1 | 13 | 0 | 1 |
| 204 | 118 | 464 | 686 | 96 | 47 | 50 | 231 | 800 |
| Surface A | | | Surface B | | | Surface C | | |

TABLE 8 wind speed 0.4 m/s, L = 550 mm

| 1 | 4 | 2 | 1 | 1 | 0 | 3 | 4 | 2 |
|---|---|---|---|---|---|---|---|---|
| 1 | 8 | 1 | 2 | 4 | 0 | 1 | 0 | 2 |
| 207 | 315 | 488 | 289 | 212 | 523 | 1163 | 662 | 2005 |
| Surface A | | | Surface B | | | Surface C | | |

TABLE 9 wind speed 0.3 m/s, L = 550 mm

| 0 | 0 | 0 | 1 | 2 | 8 | 1 | 0 | 5 |
|---|---|---|---|---|---|---|---|---|
| 1 | 0 | 0 | 8 | 0 | 4 | 1 | 0 | 4 |
| 121 | 541 | 201 | 131 | 609 | 905 | 1400 | 259 | 402 |
| Surface A | | | Surface B | | | Surface C | | |

TABLE 10 wind speed 0.2 m/s, L = 550 mm

| Surface A | | | Surface B | | | Surface C | | |
|---|---|---|---|---|---|---|---|---|
| 1 | 0 | 0 | 1 | 0 | 0 | 0 | 2 | 1 |
| 1 | 1 | 1 | 2 | 0 | 4 | 2 | 4 | 1 |
| 847 | 810 | 260 | 306 | 400 | 41 | 4752 | 211 | 4976 |

As shown in Tables 7 to 10, when no air flow was discharged from the lateral air discharger 28 of the push hood 2, poor cleanliness results were obtained in the lower regions of all Surfaces A to C with the distance L between the push hoods 2 of 550 mm. On the other hand, as shown in Tables 3 to 6, when an air flow was discharged from the lateral air discharger 28 of the push hood 2, excellent cleanliness results were obtained even when the distance L between the push hoods 2 was further extended. Hence, it was confirmed that the purified air discharge device 1 can easily be installed.

Embodiment 5 and Comparative Embodiment 9

Figure 9:
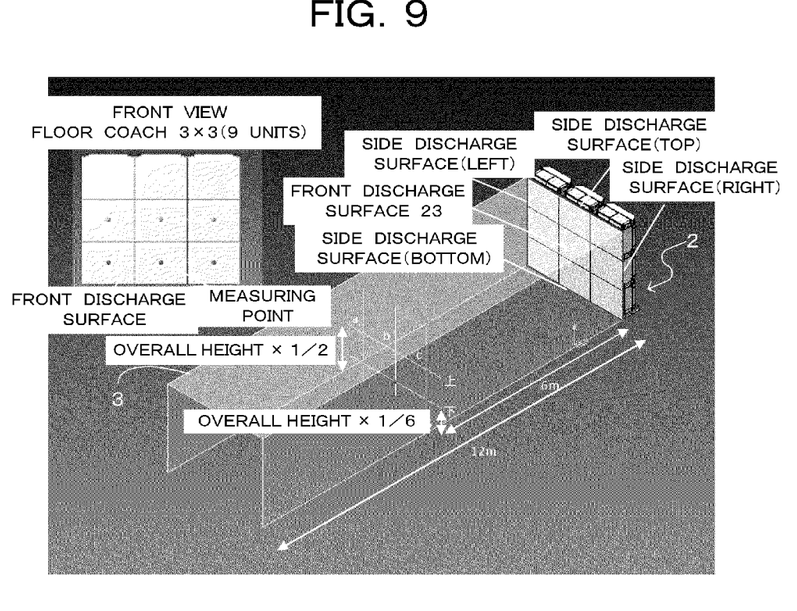
FIG. 9 is an illustration for explaining the device and measuring points in Embodiment 5 and Comparative Embodiment 9.

As shown in FIG. 9, using the purified air discharge device 1 of which the push hood 2 was provided with the guide 3 of 12 m in length and with the lateral air discharger 28 on all sides of the air flow discharge surface (front discharge surface) 23 of the push hood 2 (side discharge surface (top), side discharge surface (bottom), side discharge surface (left), and side discharge surface (right)), the cleanliness was measured at a position (plane) of 6 m away from the push hood 2. In this embodiment, nine (three in the vertical direction×, three in the horizontal direction) push hoods 2 were arranged and connected in the manner that the air flow opening surfaces thereof faced in the same direction and the short sides and long sides of the push hood 2a were next to each other, respectively. Additionally, in this embodiment, an air flow was discharged from the air flow discharge surface 23 and an air flow was discharged from the lateral air discharger 28. The wind speed of the air flow was 0.2 m/s. The measuring points were a total of six midpoints of trisected areas at heights of ½ (upper) and ⅙ (lower) of the overall height. The cleanliness was measured as in Embodiments 1 to 4. Table 11 shows the results. Additionally, Table 12 shows the results when no air flow was discharged from the lateral air discharger 28 (Comparative Embodiment 5).

TABLE 11

| | number of coarse particulates (counts/CF) | | |
|---|---|---|---|
| | a | b | c |
| Upper | 0 | 0 | 0 |
| Lower | 4 | 0 | 6 |

TABLE 12

| | number of coarse particulates (counts/CF) | | |
|---|---|---|---|
| | a | b | c |
| upper | 956 | 0 | 1341 |
| lower | 1257 | 859 | 1017 |

As shown in Tables 11 and 12, it was confirmed that excellent cleanliness results are obtained by discharging an air flow from the lateral air discharger 28. Hence, it was confirmed that the purified air discharge device 1 can easily be installed even when the push hood 2 of the purified air discharge device 1 is provided with the guide 3.

Embodiment 6

Figure 10:
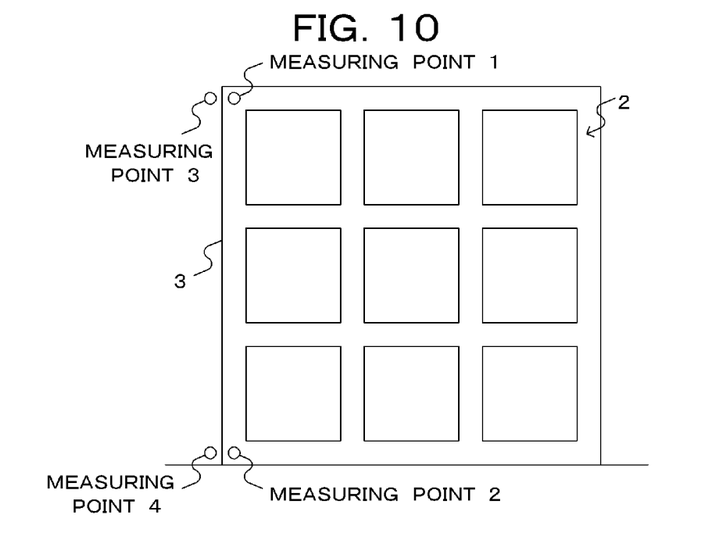
FIG. 10 is an illustration for explaining the measuring points in Embodiment 6.

As in Embodiment 5, using the purified air discharge device 1 shown in FIG. 9, the cleanliness was measured at two points in the lateral top (measuring point 1) and lateral bottom (measuring point 2) inside the guide 3 shown in FIG. 10 between the push hood 2 and guide 3. In this embodiment, an air flow was discharged from the air flow discharge surface 23 and an air flow was discharged from the lateral air discharger 28. The wind speed of the air flow was 0.3 m/s. For comparison, the cleanliness was measured at points in the lateral top (measuring point 3) and lateral bottom (measuring point 4) outside the purified air discharge device 1 (outside the guide). The cleanliness was measured as in Embodiments 1 to 5. Furthermore, the wind speed was measured at the measuring points 1 and 2. Table 13 shows the results.

TABLE 13

| position | number of coarse particulates inside guide (counts/m³) | number of coarse particulates outside guide (counts/m³) | wind speed (m/s) |
|---|---|---|---|
| lateral top | 0 (measuring point 1) | 170,029,400 (measuring point 3) | 0.29 (measuring point 1) |
| lateral bottom | 0 (measuring point 2) | 234,258,200 (measuring point 4) | 0.30 (measuring point 2) |

As shown in FIG. 13, excellent cleanliness results were obtained in regard to between the push hood 2 and guide 3. Furthermore, it was confirmed that the wind speed of the air flow does not change. Hence, it was confirmed that the purified air discharge device 1 can easily be installed even when the push hood 2 of the purified air discharge device 1 is provided with the guide 3.

This application is based on Japanese Patent Application No. 2011-219659, filed on Oct. 3, 2011, and Japanese Patent Application No. 2012-116855, filed on May 22, 2012. The entire specification, scope of claims, and drawings of the Japanese Patent Application Nos. 2011-219659 and 2012-116855 are incorporated herein by reference.

INDUSTRIAL APPLICABILITY

The present invention is useful for purified air discharge devices.

REFERENCE SIGNS LIST

1 Purified air discharge device
2 Push hood
21 Housing
22 Air flow suction surface
23 Air discharge surface
24 Fanning mechanism
25 High performance filter
26 Rectifying mechanism
27 Pre-filter
28 Lateral air discharger

The invention claimed is:
1. A purified air discharge device, comprising a push hood comprising an air flow discharge surface discharging a uniform purified air flow, wherein
the push hood is provided with a lateral air discharger for creating a purified air flow that collides against a surrounding wall that is formed as the push hood is installed and that is situated close along the circumferential direction of the air flow discharge surface of the push hood, and the purified air flow discharged from the lateral air discharger collides against the surrounding wall to create a collided air flow, and the created collided air flow is directed toward the front side and the rear side of the push hood for preventing ambient air at the rear side of the push hood from entering an area between the lateral air discharger and the surrounding wall.

2. A purified air discharge device comprising a push hood comprising an air flow discharge surface discharging a uniform purified air flow, wherein
 the push hood is provided with a lateral air discharger discharging a uniform purified air flow on all sides of the air flow discharge surface, and
 the uniform purified air flow discharged from the lateral air discharger prevents entry of ambient air at the rear side of the push hood from the lateral air discharger side.

3. The purified air discharge device according to claim 1, wherein
 the lateral air discharger is formed across the surface on which the lateral air discharger is provided in the circumferential direction of the air flow discharge surface.

4. The purified air discharge device according to claim 1, wherein
 the push hood comprises multiple push hoods connected.

5. The purified air discharge device according to claim 1, wherein
 the flow rate of the uniform purified air flow discharged from the air flow discharge surface is 0.1 to 1.0 m/s.

6. The purified air discharge device according to claim 1, wherein
 the flow rate of the uniform purified air flow discharged from the air flow discharge surface is 0.2 to 0.5 m/s.

7. The purified air discharge device according to claim 2, wherein
 the lateral air discharger is formed across the surface on which the lateral air discharger is provided in the circumferential direction of the air flow discharge surface.

8. The purified air discharge device according to claim 2, wherein
 the push hood comprises multiple push hoods connected.

9. The purified air discharge device according to claim 2, wherein
 the flow rate of the uniform purified air flow discharged from the air flow discharge surface is 0.1 to 1.0 m/s.

10. The purified air discharge device according to claim 2, wherein
 the flow rate of the uniform purified air flow discharged from the air flow discharge surface is 0.2 to 0.5 m/s.

* * * * *